(12) United States Patent
Schulz et al.

(10) Patent No.: US 8,105,416 B1
(45) Date of Patent: Jan. 31, 2012

(54) METHOD FOR RECLAIMING LEAD

(75) Inventors: Jerry D. Schulz, Burnsville, MN (US);
Robert E. Seebeck, Southlake, TX (US);
Lawrence G. Eagan, Apollo Beach, FL (US)

(73) Assignee: Stannum Group LLC, Southlake, TX (US)

( * ) Notice: Subject to any disclaimer, the term of this patent is extended or adjusted under 35 U.S.C. 154(b) by 50 days.

(21) Appl. No.: 12/774,220

(22) Filed: May 5, 2010

(51) Int. Cl.
*C22B 13/00* (2006.01)

(52) U.S. Cl. .............................. 75/697; 75/701; 75/702

(58) Field of Classification Search ................ 75/697, 75/701, 702
See application file for complete search history.

(56) References Cited

U.S. PATENT DOCUMENTS

| | | | |
|---|---|---|---|
| 1,395,820 A | 11/1921 | Harris | |
| 1,418,148 A | 5/1922 | Harris | |
| 1,573,830 A | 2/1926 | Harris | |
| 1,756,007 A | 4/1930 | Perkins et al. | |
| 1,779,272 A | 10/1930 | Heberlein | |
| 2,067,394 A | 1/1937 | Hall | |
| 2,076,800 A | 4/1937 | Thummel | |
| 2,113,643 A | 4/1938 | Betterton et al. | |
| 2,241,806 A * | 5/1941 | Burkey | 75/699 |
| 3,607,232 A | 9/1971 | Lebedeff et al. | |
| 3,793,004 A | 2/1974 | Boddey et al. | |
| 4,456,231 A | 6/1984 | Bergsoe | |
| 4,911,755 A | 3/1990 | Larouche | |
| 5,053,076 A * | 10/1991 | Burany et al. | 75/699 |
| 5,171,550 A | 12/1992 | Deininger et al. | |
| 5,451,247 A | 9/1995 | Gross et al. | |
| 6,177,056 B1 | 1/2001 | Prengaman et al. | |
| 2010/0229686 A1 * | 9/2010 | Pizzuto et al. | 75/697 |

FOREIGN PATENT DOCUMENTS

| | | |
|---|---|---|
| JP | 57-005829 A | 1/1982 |
| JP | 57-026132 A | 2/1982 |
| JP | 57-057848 A | 4/1982 |

OTHER PUBLICATIONS

The Jul. 30, 2010 PCT International Search Report for International application No. PCT/US2010/043807.

* cited by examiner

*Primary Examiner* — Roy King
*Assistant Examiner* — Tima M McGuthry Banks
(74) *Attorney, Agent, or Firm* — Kinney & Lange, P.A.

(57) ABSTRACT

A method for reducing tin in lead bullion has the steps of adding an Arrhenius base to a kettle containing lead bullion and tin, adding a byproduct of conventional detinning to the kettle, agitating contents of the kettle, and removing a layer of slag from the kettle. The disclosed method removes tin via chemical oxidation, adds lead via chemical reduction of an oxide from the byproduct of conventional detinning, and preserves most of the antimony content of the lead bullion.

20 Claims, 6 Drawing Sheets

PRIOR ART

METHOD FOR RECLAIMING LEAD

BACKGROUND

The present invention relates generally to the refinement of lead and more specifically to the treatment of byproducts created during lead refining.

Standard industrial smelter practices have a long history of refining and purifying desirable metallic products. In order to achieve a refined or more pure metallic product, impurities must be removed, which creates byproducts. Byproducts are commonly either stored and shipped offsite, or metal is reclaimed from the byproducts through a furnace or other reclamation process. The treatment and/or disposal of byproducts add to smelter cost by either replacing production capacity as a re-circulating load or adding charges for transportation, additional processing, and disposal.

Treatment and recovery of metal from smelter byproducts has been the focus of research for well over 100 years as cited in U.S. Pat. No. 4,891,067. Closely associated with the bag house dust treatment pursued in U.S. Pat. No. 2,325,176 are the economic considerations influencing the recovery of lead, tin, and antimony bearing fumes and drosses. As is the case with most fume or dust treatment procedures, hydrometallurgical processes are used to great advantage; however, the environmental, labor, and capital costs become significant. U.S. Pat. No. 4,891,067 provides a treatment process for recovering copper, iron, gold, silver, bismuth, lead, antimony, and molybdenum along with a common environmental pollutants arsenic and sulfur.

Regardless of the type of furnace or smelting operations, the volatile metal fumes of low melting temperature nonferrous metals and their oxides are customarily captured in air/fume separation systems. Those systems include an electrostatic precipitator, bag houses, and wet and dry scrubbers. U.S. Pat. Nos. 5,679,553, 5,538,532, and 5,234,669 detail procedures using chemical and mechanical techniques for the treatment of flue or bag house dusts and drosses after the flue dust is collected.

SUMMARY

A method for recovering lead from byproducts produced during conventional detinning while reducing tin in lead bullion is disclosed herein. The method includes adding an Arrhenius base to a kettle containing lead bullion and tin, adding a byproduct of conventional detinning to the kettle, agitating contents of the kettle, and removing a layer of slag from the kettle while preventing lead loss and substantially reducing antimony loss from the kettle.

One embodiment of the method includes adjusting the kettle temperature to about 413-468° C., adding sodium hydroxide into the kettle, and adding conventional tin dross into the kettle in recommended ratios. The components in the kettle are agitated and then, a layer of slag is removed from the kettle. Another embodiment of the method uses bag house dust in the place of tin dross. Both embodiments reduce tin and increase the lead contained in the lead bullion in the kettle.

DETAILED DESCRIPTION

A method for removing tin from lead bullion while simultaneously reclaiming lead from byproducts of conventional detinning is disclosed herein. Reclaiming lead values from byproducts that would normally require reintroduction into the primary smelting process will result in a reduction of refining costs. The present invention is unique, in part, because the lead reclaiming process can be conducted in the same refining kettle that initially generated the byproducts.

Figure 1:
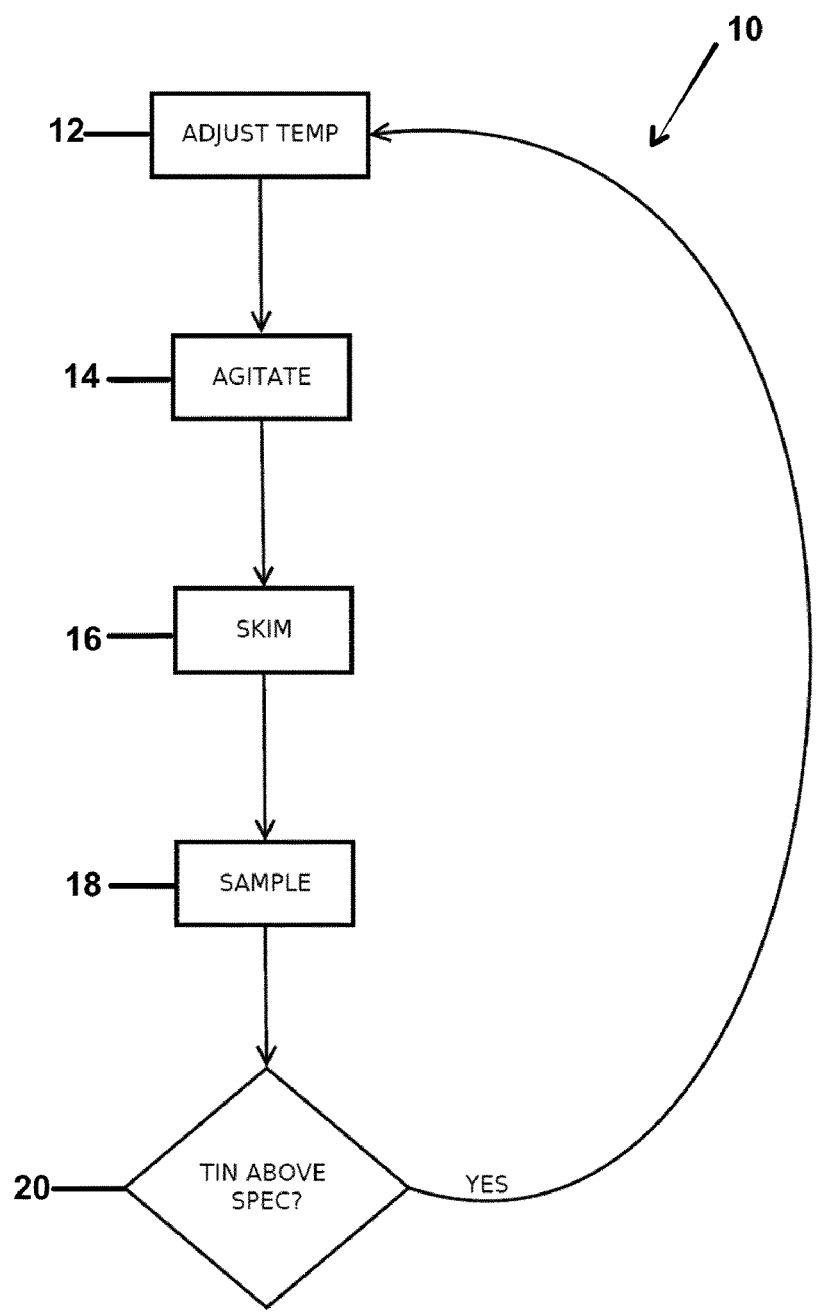
FIG. 1 is a flow sheet illustrating the steps of a conventional detinning process.

FIG. 1 is a flowchart illustrating conventional detinning 10. Conventional detinning 10 includes the steps: ADJUST TEMP 12, AGITATE 14, SKIM 16, SAMPLE 18, and TIN ABOUT SPEC? 20. The process of conventional detinning 10 produces undesirable byproducts such as tin dross or other lead bearing dusts and oxides. Tin dross is undesirable as a product for re-smelting because the tin has to be removed again. The lead loss from the refining process represents twelve to fourteen times the weight of tin removed.

To begin the process of conventional detinning 10, a kettle bath containing hard lead bullion after removal of first dross and copper dross must be brought to the appropriate temperature of about 1150-1220° F. (621-660° C.) (ADJUST TEMP step 12). The oxidation of tin and lead in the bullion is an exothermic reaction. Dross formed while adjusting the temperature of the kettle should not be initially skimmed from the kettle. Once at the proper temperature, the kettle bath is agitated (AGITATE step 14) typically by mechanical means. If air blow pipes are inserted into the kettle bath, the air supplying the blow pipes with an initially low flow rate should be turned on gradually. A dry, powdery yellow material, known as tin dross, will form on the surface of the bath. The dross should be skimmed from the kettle (SKIM step 16) when the thickness of the dross blanket fills the vortex formed by agitation. A shovel may be used to slice off the top of the dross and care should be taken to prevent physical entrapment of lead while skimming.

The tin dross will include varying amounts of arsenic, antimony, 40-70% lead as oxide, and small amounts of other oxides. The tin dross is generally segregated from other drosses for later processing. Skimming the dross (SKIM step 16) may also include scraping the sides of the kettle so that the kettle is clean. At this point, the lead in the kettle is sampled for lab analysis (SAMPLE step 18). If the amount of tin is above the predetermined specification for the desired alloy (TIN ABOVE SPEC? step 20), then the entire process is repeated beginning with verifying the temperature ADJUST TEMP step 12. The process may be continued in this looped fashion until the desired tin level is achieved. When the sample contains the predetermined amount of tin, then the process of conventional detinning 10 is complete.

The purpose of conventional detinning 10 is to reduce the tin content in hard lead bullion to the predetermined alloy specification. The direction of the chemical reaction occurring in conventional detinning 10 is Pb+½ $O_2 \rightarrow$ PbO. Conventional detinning 10 and lead smelting produce at least two undesirable byproducts: tin dross and bag house dust. Tin dross generally comprises about 7-12% tin oxide, 70-80% lead oxide, 5-8% antimony oxide and lesser amounts of other metallic oxides, sulfates, and carbonates of alloy metals such as arsenic and selenium. Once tin levels and the re-circulating load in the tin dross become too high, the tin dross is sold for a price that is usually about 30% of the finished goods price. Detinning or refinery bag house dust may have an assay similar to that of tin dross, and is often combined with blast furnace bag house dust. Furnace bag house dust can contain lead oxides, arsenic oxides, antimony oxides and lesser amounts of the elements in groups 1b, 2b, and groups 3a thru 7a of the periodic table. In addition, the oxides just mentioned may be present in the form of chlorides and sulfates. The method in accordance with the present disclosure recycles the byproducts of conventional detinning 10, such as tin dross and bag house dust, and increases smelter profitability by reclaiming lead from the byproducts and preventing the loss of antimony.

Figure 2:
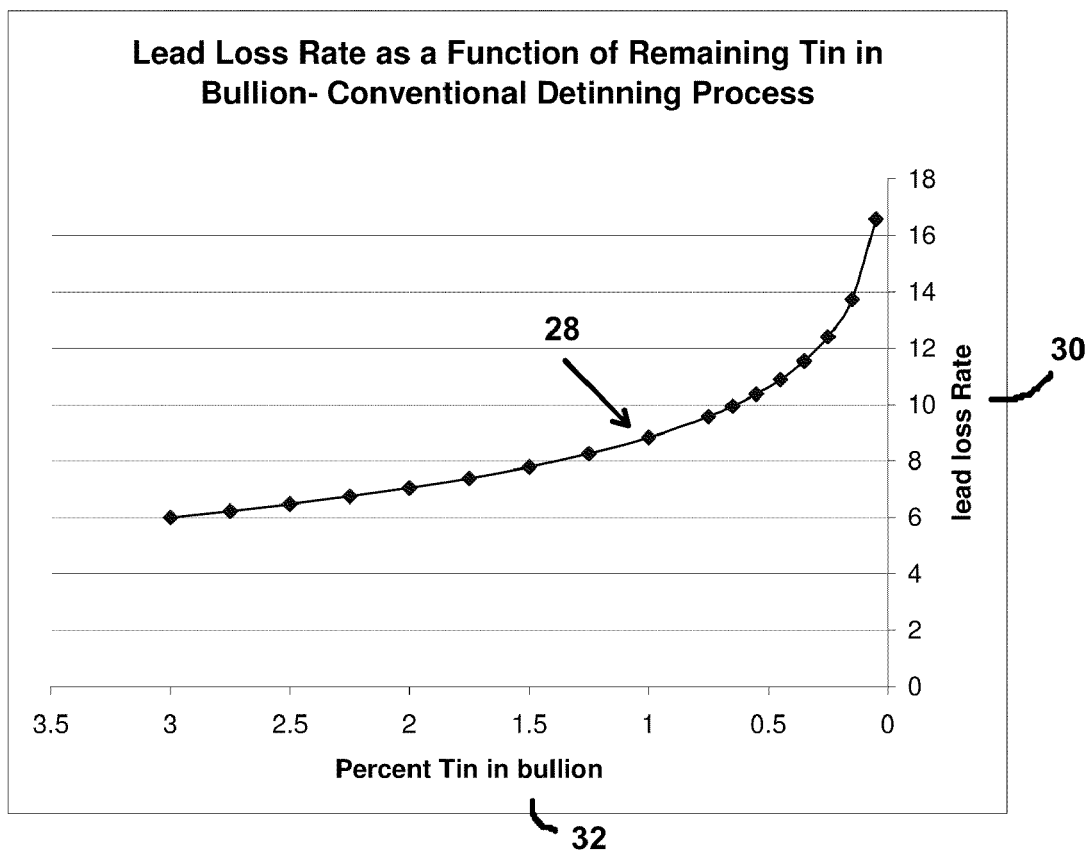
FIG. 2 is a graph showing conventional detinning lead loss as a function of tin remaining in a kettle.

FIG. 2 is a graph illustrating rate of lead loss 28 associated with conventional detinning 10. Lead loss 30 (in weight; y-axis) is shown as a function of tin content 32 remaining in the kettle (as a percent; x-axis). As depicted, the amount of lead loss 30 increases in a nonlinear manner as the tin content 32 remaining in the kettle decreases, thereby producing the rate of lead loss 28. Conventional detinning 10 generally results in an overall lead loss of about 8-14% of the lead treated. Since the amount of refined lead is reduced through conventional detinning 10, profits are also reduced. One object of the present invention is to reduce the amount of lead loss 30 associated with conventional detinning 10. The claimed method is effective in achieving this goal and refinery operators will see an actual lead metal gain measured in the refining kettle of about 60% of lead contained in the byproduct added to the kettle. The lead gained in the kettle is reduced from the lead oxide added to the kettle in the form of byproducts through oxidation of the tin. The byproducts would otherwise be recycled through the other pyro-metallurgical processes such as reverberatory, blast, rotary, and electric furnaces.

Figure 3:
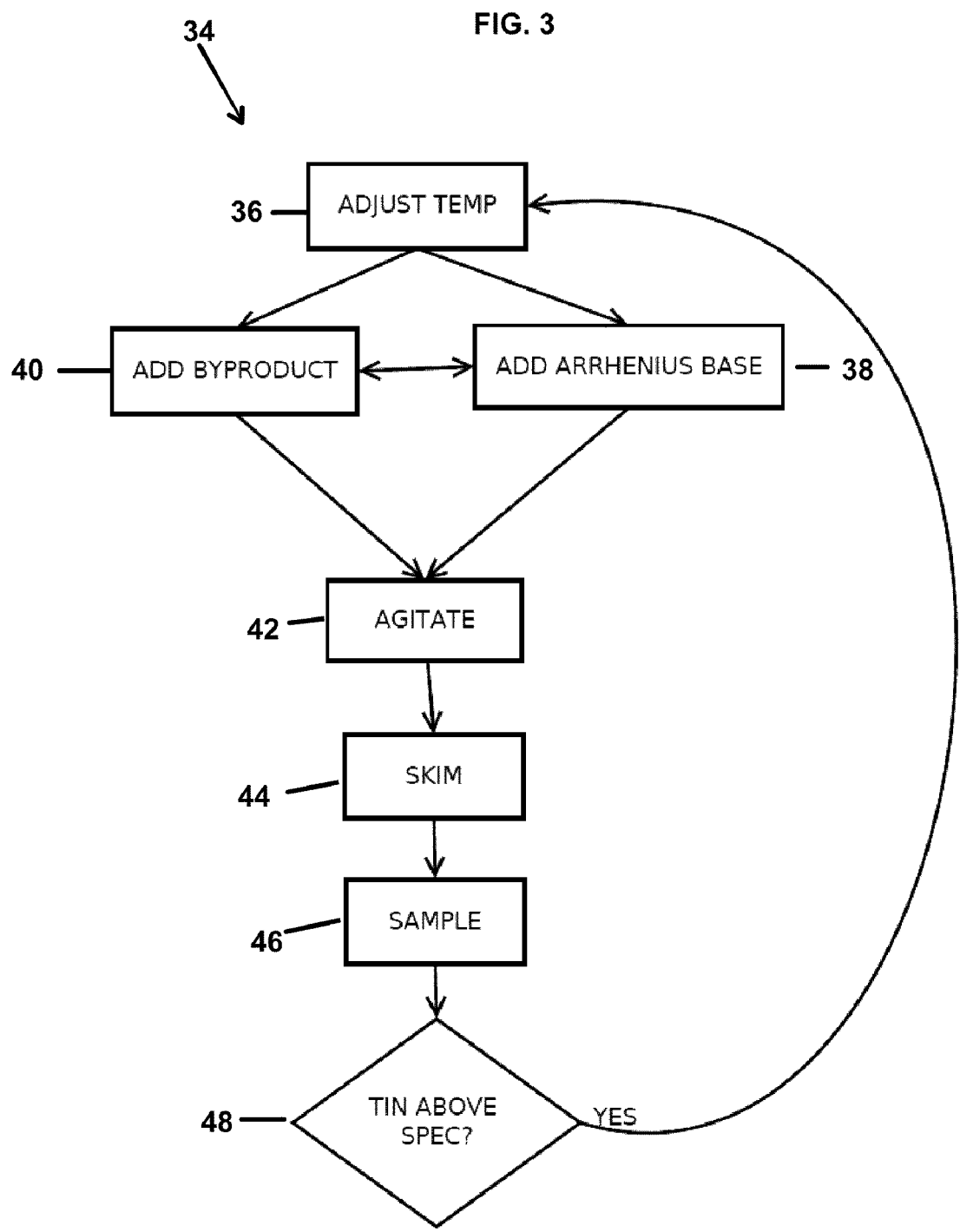
FIG. 3 is a flow sheet illustrating a method for reclaiming lead in accordance with the present disclosure.

FIG. 3 is a flowchart illustrating method 34 in accordance with the present disclosure. Method 34 includes steps: ADJUST TEMP 36, ADD ARRHENIUS BASE 38, ADD BYPRODUCT 40, AGITATE 42, SKIM 44, SAMPLE 46, and TIN ABOVE SPEC? 48. Method 34 increases the amount of lead in the lead bullion and decreases the amount of tin in the lead bullion while essentially preserving the antimony content in the lead bullion.

To begin method 34, a kettle containing lead bullion should be brought to the appropriate temperature of about 775-875° F. (413-468° C.) (ADJUST TEMP step 36). For ease, method 34 may occur directly after conventional detinning 10, in the same kettle. While kettle sizes in modern refineries can exceed 165 tons, a 100 ton (90700 Kg) kettle was used in this instance. After the appropriate temperature is reached, (which usually entails cooling down from the 1150-1220° F. range used for conventional detinning 10 to an optimal range 775-850° F.) an Arrhenius base is added to the kettle (ADD ARRHENIUS BASE step 38). The Arrhenius base can be added incrementally and may be, for example, sodium hydroxide, calcium hydroxide, or potassium hydroxide and is otherwise known as caustic. A byproduct of conventional detinning is also added to the kettle (ADD BYPRODUCT step 40), generally in an incremental fashion. The byproduct of conventional detinning may be, for example, tin dross or bag house dust. The byproduct of conventional detinning can be added (ADD BYPRODUCT step 40) before, after, or simultaneously with the Arrhenius base (ADD ARREHENIUS BASE step 38). In fact, the byproduct of conventional detinning and the Arrhenius base can be premixed. Continuous agitation is applied during and after the byproduct of conventional detinning and the Arrehnius base are added. The contents of the kettle are agitated (AGITATE step 42) by mixer for approximately 30 minutes. A slag layer will form in the kettle, which is then skimmed off (SKIM step 44). Next, the contents of the kettle are sampled (SAMPLE step 46). If the sample indicates that the amount of tin is above the predetermined specification for the desired alloy (TIN ABOVE SPEC? step 48), then method 34 is repeated. The number of times method 34 is repeated depends on the initial content of tin in the lead bullion and the desired endpoint. When the sample indicates that the amount of tin is at the predetermined specification for the desired alloy, then method 34 is complete. Two embodiments of method 34 using byproducts of conventional detinning 10 are presented below.

In a first embodiment of method 34, the Arrhenius base is sodium hydroxide and the byproduct of conventional detinning is tin dross. About 4.1 pounds (1.9 kg) of sodium hydroxide per pound (453.6 grams) of tin remaining in the kettle is added during step 38. About 4 pounds of tin dross (1.8 kg) per pound (453.6 grams) of tin remaining in the kettle is added during step 40. In other words, a sodium hydroxide to tin dross ratio of about 1.025 will successfully perform method 34 (e.g. 1000 pounds of sodium hydroxide and 975 pounds of tin dross). Sodium hydroxide sufficient to react with both the tin in the hard lead bullion and the tin in the tin dross (about 13% more than an average tin dross application) is desirable. In practice, method 34 is quite flexible and byproduct to Arrhenius base (NaOH) ratios of 0.93-1.4 have proven successful. The most efficient use of the Arrhenius base, however, is still a function of the amount of oxidized lead available. If tin dross is being used for step 40 and tin dross is not readily available (e.g. conventional detinning 10 was not just performed in the kettle), then tin dross may be produced according to the method presented in FIG. 1.

In a second embodiment of method 34, the Arrhenius base is sodium hydroxide and the byproduct of conventional detinning is bag house dust. About 3.8 pounds (1.7 kg) of sodium hydroxide per pound (453.6 kg) of tin remaining in the kettle is added during step 38. About 3.9-4.5 pounds (1.8-2.0 kg) of bag house dust per pound (453.6 kg) of tin remaining in the kettle is added during step 40. In other words a ratio of bag house dust to sodium hydroxide should be about 1.1 (e.g. 1100 pounds of bag house dust for 1000 pounds of sodium hydroxide). The amount of bag house dust is increased in proportion to the difference between the lead content assay of lead oxide (92.9%) and the lead oxide content assay of the bag house dust (typically 75-85%). In either the first embodiment or the second embodiment of method 34, sodium hydroxide and byproducts containing lead oxide are dispersed in the kettle by agitation. The lead oxide reacts with tin such that the lead oxide is reduced to metal and the tin in the bullion is oxidized into tin oxide. The result of method 34 is more lead and less tin in the kettle.

Figure 4:
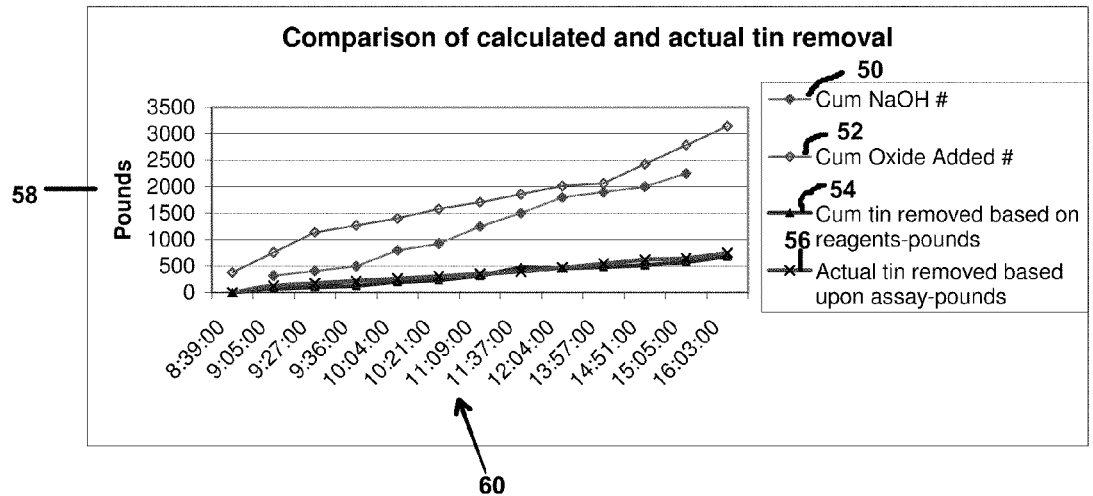
FIG. 4 is a graph comparing calculated and actual tin removal for the method of FIG. 3.

FIG. 4 is a graph comparing calculated and actual tin removal for method 34. Illustrated in FIG. 4 are two reagents added into the kettle during method 34: sodium hydroxide 50 and lead oxide bearing dust 52. Also shown are predicted tin removal 54 and actual tin removal 56, which are both fairly linear. Pounds 58 (y-axis) are shown as a function of time 60 (x-axis) to demonstrate the similarity between predicted tin removal 54 based on the amount of reagents 50, 52 added and actual tin removal 56 based on spectrographic assay.

As shown, method 34 creates actual tin removal rate 56 that is very similar to predicted tin removal rate 54. The stoichiometric and quantitative reactions of tin with reagents 50, 52 gives the smelting operator an additional element of process control that is neither time nor temperature dependent within the range specified. In other words, the chemical reactions within the kettle are defined by the stoichiometry of the lead oxide used and the tin content in the lead bullion. Since both the tin removal rate and the quantitative removal of tin are defined, the reagents required for any particular amount of tin to be removed can be calculated with great accuracy.

Method 34 is increasingly advantageous for kettles containing low levels of tin. As described above with respect to FIG. 2, low levels of tin would normally be associated with higher rates of lead loss during conventional detinning 10. With conventional processes, more than 10% of the lead metal originally charged to the kettle is lost for tin levels of less than 0.5%. The economic break-even point for method 34, however, is determined by the cost of reagents, particularly sodium and potassium hydroxide, the net sale price of the tin dross delivered to the off-site smelter, and direct labor costs, which will vary from site to site. When used on kettles containing low levels of tin, method 34 will markedly increase profits by increasing the amount of lead recaptured and further processing conventional byproducts.

Figure 5:
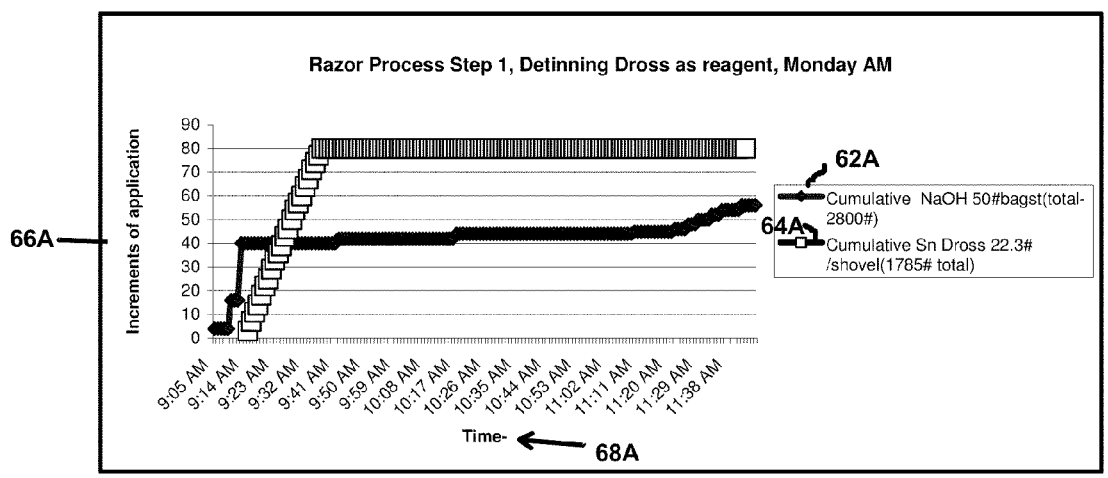
FIG. 5 is a graph showing a first experiment where tin dross was used for the method of FIG. 3.

FIG. 5 is a graph demonstrating first experimental results for the first embodiment of method 34 where sodium hydroxide 62A is the Arrhenius base and tin dross 64A is the byproduct. Increments of application 66A (y-axis) were measured for sodium hydroxide 62A and tin dross 64A over time 68A (x-axis). About 75 tons of hard lead bullion containing 0.55% tin was heated to about 800° F. (+/−35° F.) (ADJUST TEMP step 36). Containers of tin dross from conventional detinning 10 were pre-weighed and set near the kettle. Sodium hydroxide granules contained in 50 pound sacks were also positioned nearby. After calculating the weight of sodium hydroxide required and the amount of tin dross to be used, approximately 50% of the required sodium hydroxide (ADD ARRHENIUS BASE step 38) was added to the kettle during agitation (AGITATE step 42). Addition of the tin dross (ADD BYPRODUCT step 40) began at the point at which 50% of the sodium hydroxide had been added (ADD ARRHENIUS BASE step 38) into the kettle. The tin dross was added (ADD BYPRODUCT step 40) at a rate of about 3.5 shovels/minute over the next 30 minutes. The weight of dust per shovel was calculated by counting the number of shovels per net weight change of byproduct. In this case, the weight of dust per shovel was about 22 pounds. In total, about 4585 pounds combined of sodium hydroxide 62A and tin dross 64A were added to the kettle. The reagents created a deep (greater than 5-6 inches) layer of molten slag on the kettle, which became increasingly difficult for the mixer to pull into the vortex as the material become more viscous over time. While the depth of the slag layer produced for any given amount of reagents added is a function of the kettle diameter, the important factor is the energy applied through the speed of the mixer (regardless of kettle diameter). The addition of the remaining few bags of sodium hydroxide 62A (ADD ARRHENIUS BASE 38) failed to lower the viscosity of the slag. Upon completion, about 75 tons of lead was processed. A decision was made to remove the entire molten layer (SKIM step 44) and repeat the test using a smaller amount of Arrehnius base and dust with a slower rate of addition for the tin dross to accommodate the limitations of the mixer.

Figure 6:
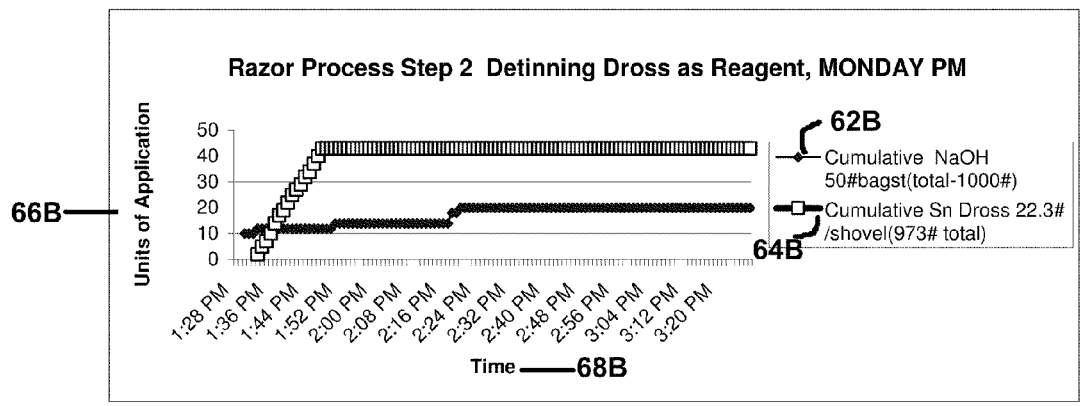
FIG. 6 is a graph showing a second experiment where tin dross was used for the method of FIG. 3.

FIG. 6 is a graph demonstrating second experimental results for the first embodiment of method 34 where sodium hydroxide 62B is the Arrhenius base and tin dross 64B is the byproduct. Increments of application 66B (y-axis) were again measured for sodium hydroxide 62B and tin dross 64B over time 68B (x-axis). This second experiment proceeded in a similar manner to the first experiment, with pre-weighed reagent materials staged near the kettle for easy manual addition. Fifty percent of the sodium hydroxide to be used was added to the kettle (ADD ARRHENIUS BASE step 38) when the kettle temp was about 830° F. (443° C.) (ADJUST TEMP step 36). Pre-weighed tin dross was added (ADD BYPRODUCT step 40) at a rate of 2.6 shovels/minute to facilitate mixing. In this case, the weight of dust per shovel was about 22 pounds. The total amount of sodium hydroxide 62B and tin dross 64B added to the kettle was about 1973 pounds and upon completion about 75+ tons of lead was processed.

Figure 7:
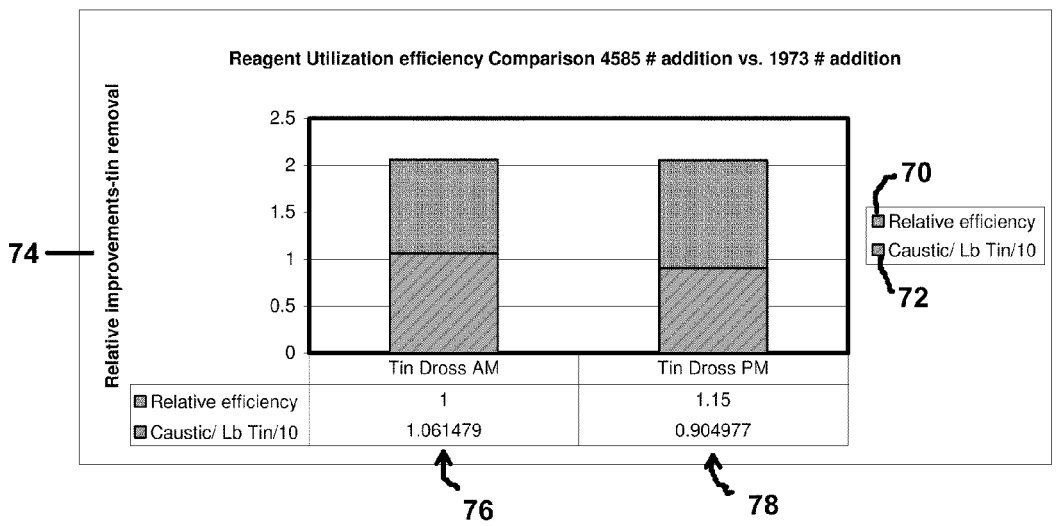
FIG. 7 is a graph comparing the first and second experiment of FIGS. 5 and 6, respectively.

FIG. 7 compares reagent utilization for the first and second sets of experimental data underlying FIGS. 5 and 6, respectively. Depicted are relative efficiency 70 and ratio ((sodium hydroxide/pound tin)/ten) 72 to show relative improvement in tin removal 74 (y-axis) between first experiment 76 (x-axis; left) and second experiment 78 (x-axis; right). As shown, first experiment 76 had relative efficiency 70 of 1 and ratio ((sodium hydroxide/pound tin)/ten) 72 of 1.06. Second experiment 78 had relative efficiency 70 of 1.15 and ratio ((sodium hydroxide/pound tin)/ten) 72 of 0.905. Second experiment 78, demonstrated about a 15% improvement over first experiment 76. It has been demonstrated in this and subsequent tests, that agitation was more important than the rate of tin dross addition in achieving the results of second experiment 78. The amount of tin removed (determined spectrographic analysis of the lead) was higher in second experiment 78 than for the same amount of reagents used in the first experiment 76. This beneficial result was the result of the decreased slag thickness such that the vortex at the mixer shaft remained visible even when the molten material volume expanded and slight foaming was occurring.

Figure 8:
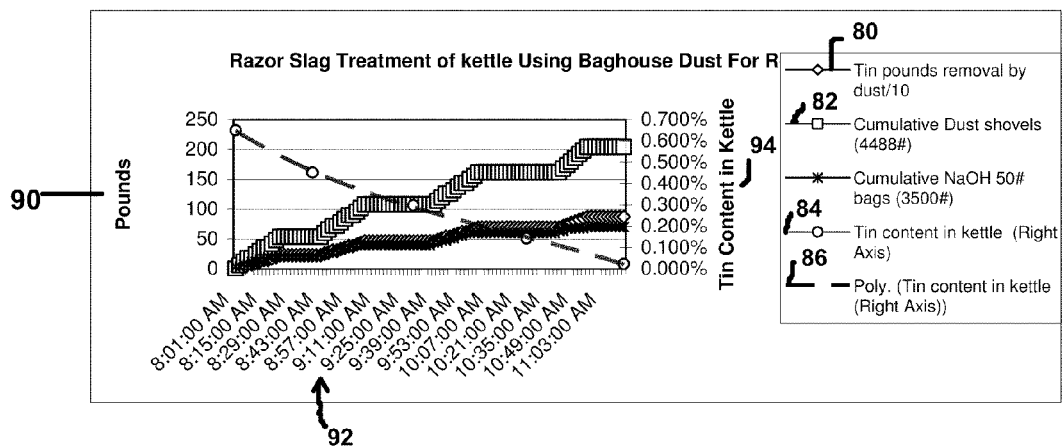
FIG. 8 is a graph showing an experiment where bag house dust was used for the method of FIG. 3.

FIG. 8 is a graph demonstrating experimental results for the second embodiment of method 34 where sodium hydroxide is the Arrhenius base and bag house dust is the byproduct. Shown in FIG. 8 are tin removed 80, bag house dust 82, sodium hydroxide 84, and tin remaining in kettle 86. Pounds 90 (left y-axis) of each material were measured over time 92 (x-axis) and compared against percent of tin in the kettle 94 (right y-axis). Small amounts of sodium hydroxide 84 (ADD ARRHENIUS BASE step 38) and bag house dust 82 (ADD BYPRODUCT 40) were added incrementally over time 92 and totaled about 1 ton. The mixture was agitated for about 30 minutes (AGITATE step 42), and the agitator turned off so the slag could be skimmed off (SKIM step 44). Samples were taken (SAMPLE step 46) to analyze the tin content of the bullion (TIN ABOVE SPEC? step 48) and compared with the calculated removal rate based upon the reagents added. Agreement was reasonably close, with the end result showing that 96.9% of the predicted tin amount was actually removed. A total of 76 tons of lead was processed with bag house dust.

Figure 9:
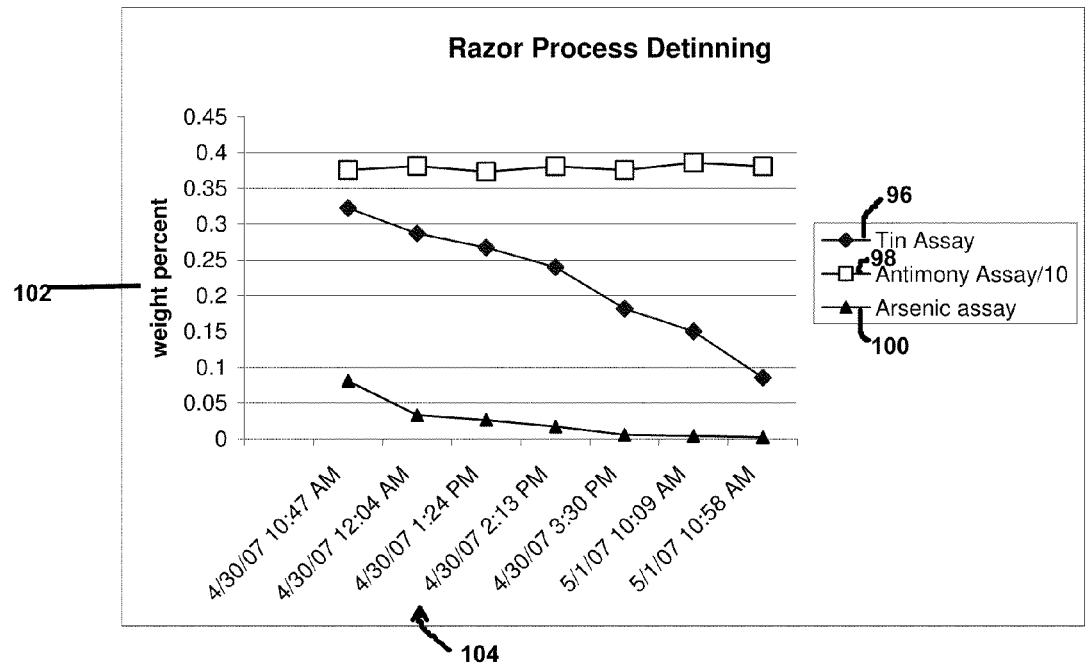
FIG. 9 is a graph showing how the method preserves antimony while selectively oxidizing tin and arsenic.

FIG. 9 is a graph illustrating how method 34 preserves antimony 98 while selectively oxidizing tin 96 and arsenic 100. Shown in FIG. 9 are tin assay 96, antimony assay 98 arsenic assay 100. Weight percent 102 is presented (y-axis) over time 104 (x-axis) for each of tin 96, antimony 98, and arsenic 100 during method 34. As shown, method 34 preserves antimony 98 which appears relatively stable while reducing both tin 96 and arsenic 100. Contrast the results shown in FIG. 9 with industry practice of conventional detinning 10, which removes incidentally antimony. The amount of antimony removed during conventional detinning 10 results in a tin dross byproduct having about 5-8% antimony and about 7-14% tin. The loss of antimony during conventional detinning 10 will require replacement using new purchased antimony at a cost two to four times greater than the lead. Method 34 employs selective oxidation of tin and arsenic and the addition of lead by reduction of lead-bearing byproducts while preserving antimony content.

Method 34 results in a lead gain because the detinning process employed recovers lead from the bag house dust or tin dross. The re-addition of a byproduct or waste is counterintuitive, but when utilized properly will selectively oxidize tin and arsenic while leaving antimony virtually unchanged. Method 34 recovers lead from the bag house dust or tin dross, while removing the impurities because the lead supplied through the byproducts provides the oxygen for the tin and arsenic removal. The least amount of lead oxide recycled is 3.8 lbs (1.72 kg) per pound (0.45 kg) of tin removed, whereas the lower lead content fumes, dusts, and drosses will recycle up to 5.4 pounds (2.45 kg) of fume or dross per pound (0.45 kg) of tin removed. Ultimately, the amount of lead recovered will approximate 3.5 pounds (1.59 kg) of lead per pound (0.45 kg) of tin removed from the bullion. Method 34 reduces cycle times, fuel consumption, and costs for lead de-tinning. Additionally, the recycling efficiencies of lead detinning byproducts such as tin dross and bag house dust are markedly increased compared to conventional reprocessing through the pyrometallurgical steps that produced the byproducts in the first place. The recycling process may require only minor equipment modification and will avoid the need for significant upfront investment.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method comprising:
   a. adding an Arrhenius base to a kettle containing lead bullion and tin;
   b. adding a byproduct of conventional detinning to the kettle;
   c. agitating contents of the kettle; and
   d. removing a layer of slag from the kettle, wherein the method reduces the amount of tin via chemical oxidation in the lead bullion.

2. The method of claim 1, further comprising:
   e. measuring how much tin remains in the lead bullion;
   f. repeating steps a-d until desired amount of tin is removed from the lead bullion.

3. The method of claim 1, further comprising:
   g. adjusting the kettle temperature to about 413-468° C.

4. The method of claim 1, wherein the byproduct of conventional detinning is tin dross.

5. The method of claim 1, wherein the byproduct of conventional detinning is bag house dust.

6. The method of claim 1, wherein the Arrhenius base is sodium hydroxide.

7. The method of claim 6, wherein about 3.8-4.1 kilograms of sodium hydroxide is added to the kettle per kilogram of tin in the kettle.

8. The method of claim 1, wherein the byproduct of conventional detinning is added incrementally to the kettle.

9. The method of claim 1, wherein the Arrhenius base is added incrementally to the kettle.

10. The method of claim 1, wherein the method achieves an increase of about 3% lead in the kettle.

11. A method comprising:
   a. adjusting a kettle temperature to about 413-468° C., the kettle containing lead bullion and tin;
   b. adding sodium hydroxide into the kettle;
   c. adding tin dross into the kettle;
   d. agitating components in the kettle; and
   e. removing a layer of slag from the kettle, wherein the method reduces tin via chemical oxidation and adds lead via chemical reduction to the lead bullion in the kettle.

12. The method of claim 11, further comprising:
   f. measuring how much tin remains in the kettle;
   g. repeating steps a-e until a desired amount of tin is removed from the lead bullion.

13. The method of claim 11, wherein the ratio of sodium hydroxide to tin dross is about 1.025.

14. The method of claim 11, wherein step b comprises adding about 4.1 kilograms of sodium hydroxide per kilogram of tin remaining in the kettle.

15. The method of claim 11, wherein step c comprises adding about 4 kilograms of tin dross per kilogram of tin remaining in the kettle.

16. A method comprising:
   a. adjusting a kettle temperature to about 413-468° C., the kettle containing lead bullion and tin;
   b. adding sodium hydroxide into the kettle;
   c. adding bag house dust into the kettle;
   d. agitating components in the kettle; and
   e. removing a layer of slag from the kettle, wherein the method reduces tin via chemical oxidation and adds lead via chemical reduction to the lead bullion in the kettle.

17. The method of claim 16, further comprising:
   f. measuring how much tin remains in the kettle;
   g. repeating steps a-e until desired amount of tin is removed from the lead bullion.

18. The method of claim 16, wherein the ratio of bag house dust to sodium hydroxide is about 1.1.

19. The method of claim 16, wherein step b comprises adding about 3.8 kilograms of sodium hydroxide per kilogram of tin remaining in the kettle.

20. The method of claim 16, wherein step c comprises adding about 3.9-4.5 kilograms of bag house dust per kilogram of tin remaining in the kettle.

* * * * *